United States Patent [19]

Higginson et al.

[11] 4,380,415
[45] Apr. 19, 1983

[54] LATCH MECHANISM FOR WALK RAMPS

[75] Inventors: Roy C. Higginson, Honeybrook; Paul L. Whiteman, Morgantown, both of Pa.

[73] Assignee: Morgan Trailer MFG. Co., Morgantown, Pa.

[21] Appl. No.: 191,502

[22] Filed: Sep. 29, 1980

[51] Int. Cl.³ .............................................. B60P 1/00
[52] U.S. Cl. .............................................. 414/537
[58] Field of Search ...................... 414/537, 538, 522; 70/228; 312/242; 224/42.41, 42.44, 281, 315; 296/26

[56] References Cited

U.S. PATENT DOCUMENTS

| 2,284,419 | 5/1942 | Greig | 296/26 |
| 3,511,393 | 5/1970 | Abromavage et al. | 414/537 |
| 3,768,673 | 10/1973 | Nydam et al. | 414/522 |
| 4,198,187 | 4/1980 | Mountz | 414/537 |

Primary Examiner—Robert G. Sheridan
Attorney, Agent, or Firm—Z. T. Wobensmith, 2nd; Z. T. Wobensmith, III

[57] ABSTRACT

A latch mechanism for walk ramps for truck bodies and the like is disclosed which includes, on each side of the walk ramp at its rear end and for retaining the walk ramp in its stored position usually below the floor of the truck body, locking handles carried on vertical pivots and provided with latch fingers which are normally resiliently urged to locked positions but movable to release positions to permit the withdrawal of the walk ramp for use.

4 Claims, 3 Drawing Figures

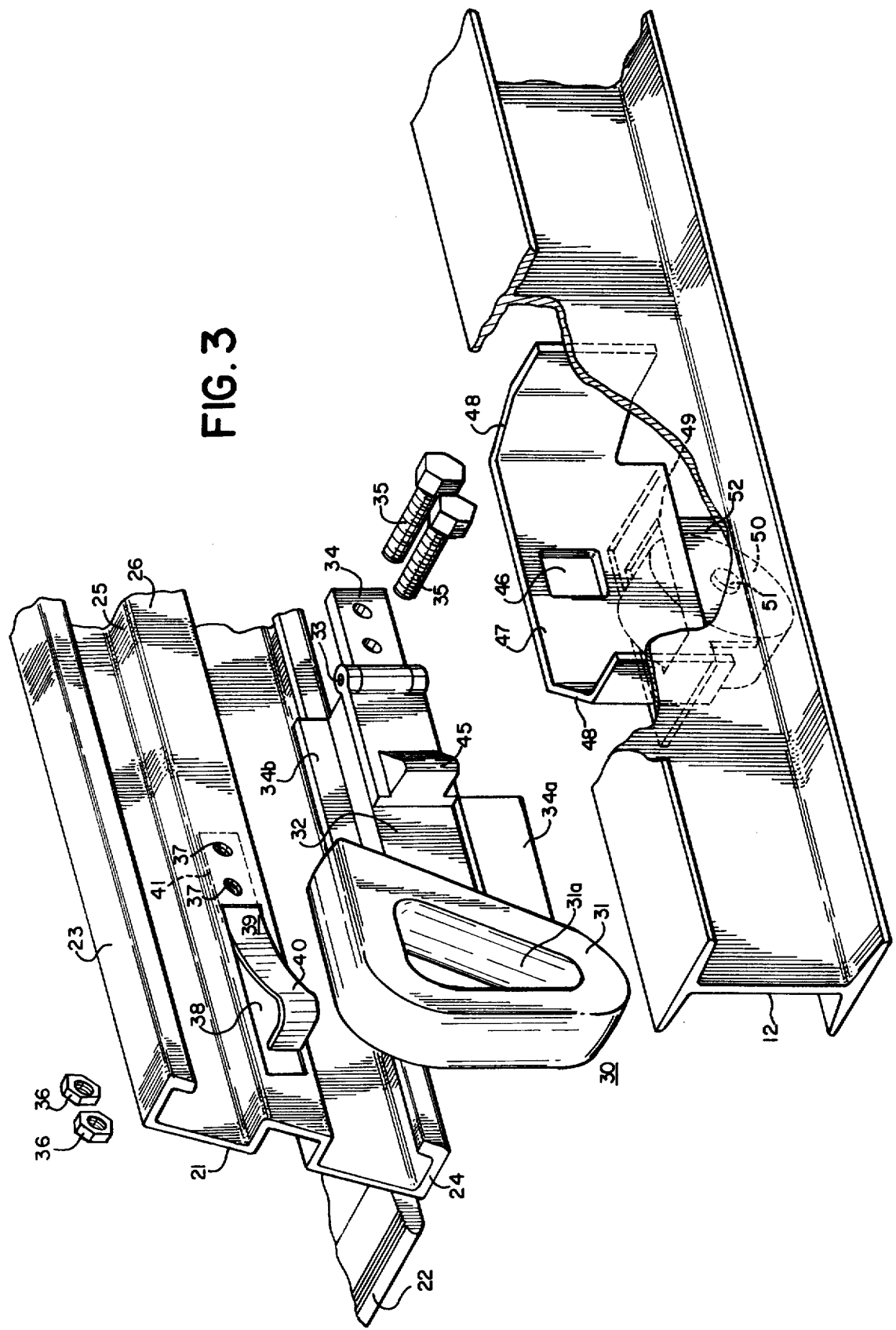

LATCH MECHANISM FOR WALK RAMPS

BACKGROUND OF THE INVENTION

1. Field of the Invention

This invention relates to latch mechanism for walk ramps for truck bodies and the like.

2. Description of the Prior Art

Various latch mechanisms have heretofore been proposed in which a centrally disposed handle at the rear end of the walk ramp is provided but this requires a rear cross member on which the handle is mounted and which carries releasable locking members engageable with the body and which are actuated by the handle. This construction adds unnecessarily to the cost and to the weight. The U.S. patent to Abromovage et al., U.S. Pat. No. 3,511,393 shows one such mechanism.

Nydam et al., in U.S. Pat. No. 3,768,673, in FIGS. 16 and 17 shows a latch mechanism disposed on one side which includes a spring pressed plunger to engage the walk ramp to retain it in the stored position.

It has also been proposed to provide handles at each side of the rear end of a walk ramp which are carried on horizontal pivots which must be depressed for release against the force of springs which are intended to be anti-bounce.

Mountz, in U.S. Pat. No. 4,198,187, shows fixed handles at the rear end of the ramp to facilitate moving the ramp body and a centrally located releasable catch 53 normally resiliently urged into engagement with the outer end of the ramp floor to releasably retain the ramp in stored position.

The latch constructions now available are relatively complex, and add to the cost and to the weight of the vehicle with attendant higher fuel consumption.

SUMMARY OF THE INVENTION

In accordance with the invention a latch mechanism is provided for walk ramps for trucks and the like in which a pair of vertically pivoted handles are provided with latch portions normally resiliently urged to locked positions with respect to brackets carried by the body of the truck, the handles being swingable toward each other in a natural motion for release of the latch portions and withdrawal of the walk ramp.

It is the principal object of the invention to provide latch mechanism for walk ramps for trucks and the like which is simple in construction, reliable in use, easy to operate, and which will aid in reduction of cost and of weight.

It is a further object of the invention to provide latch mechanism for walk ramps for trucks and the like which is free from likelihood of unintended release.

It is a further object of the invention to provide latch mechanism for walk ramps for trucks and the like in which the release of the latch mechanism is by a natural motion and consistent with the withdrawal of the walk ramp for use.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which:

FIG. 3 is an exploded perspective view of the latch mechanism at the right of FIGS. 1 and 2.

Figure 1:
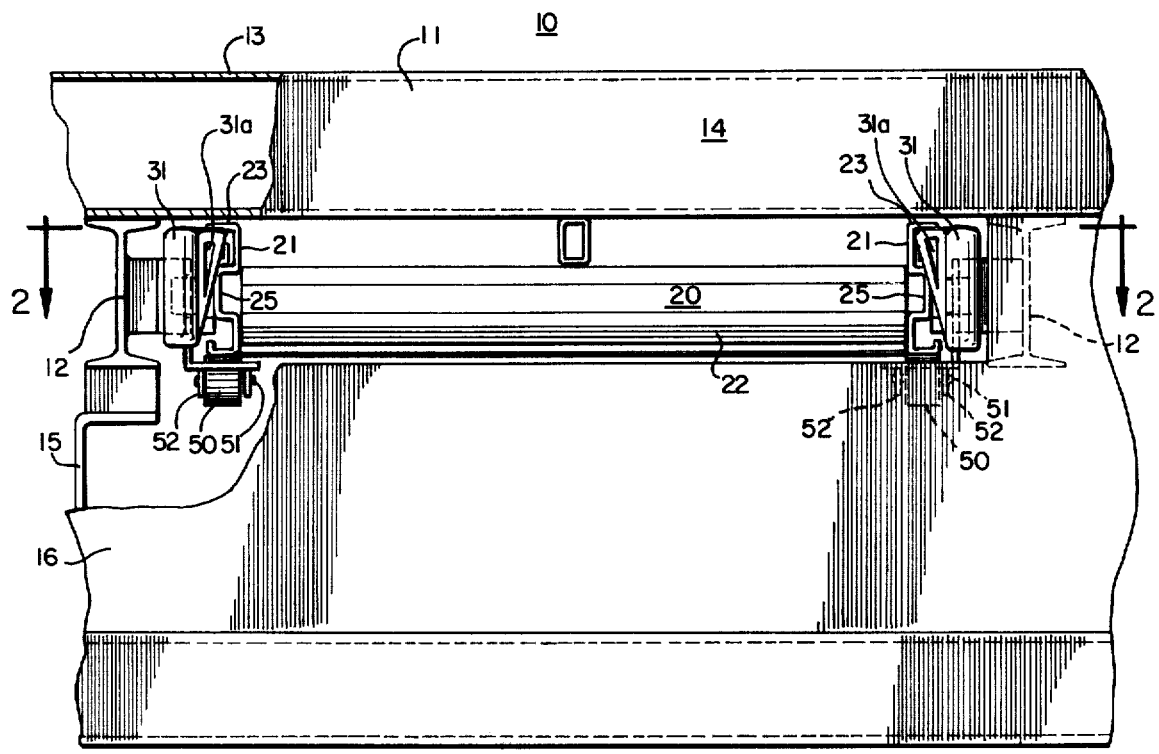
FIG. 1 is a rear elevational view of a walk ramp having the latch mechanism of the present invention incorporated therein, part being broken away to show the long rail of the truck body in its relation to the chassis rail.
Figure 2:
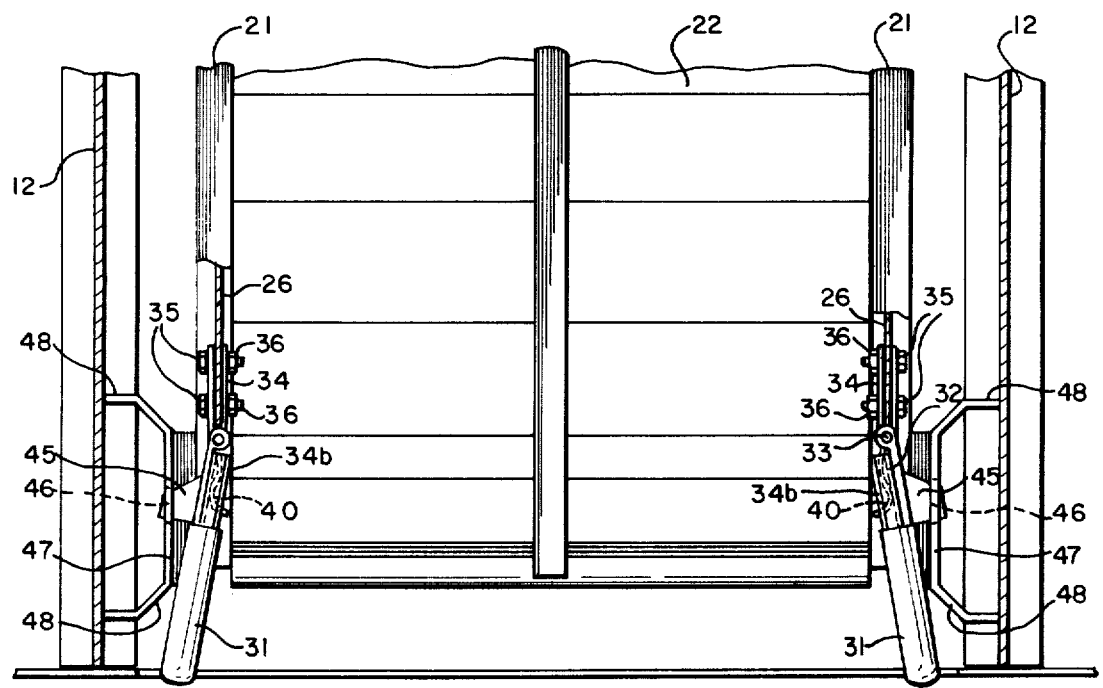
FIG. 2 is a horizontal sectional view on the line 2—2 of FIG. 1.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings, the rear end of a truck 10 is shown having a truck body 11 with parallel longitudinal horizontal frame or long rails 12 and a transverse rear horizontal frame rail 13 and cover 14 therefor. The truck body 11 is supported on and secured to parallel longitudinal horizontal chassis rails 15. The rear ends of the chassis rails 15 are covered by a downwardly extending apron 16.

The apron 16 has an opening 17 for the reception and retention of a walk ramp 20 which can be supported by the long rails 12 or the chassis rails 15 in any desired manner. One mode of support is shown in the prior U.S. Pat. No. 4,198,187 to Elton E. Mountz. The walk ramp 20 is provided with side frame bars 21 with a ramp floor 22, preferably of planking, therebetween and below the upper rims 23 of the side frame bars 21 and may have its lower face aligned with the upper rims 24.

The side frame bars 21 may have outwardly disposed channels 25 therealong to provide mounting faces 26 for structure to be described.

The latch handles 30 preferably have handle portions 31 with openings 31a for manual gripping carried by supported plates 32 which are pivotally connected by vertical hinge pins 33 to hinge plates 34. The hinge plates 34 on each side are preferably secured to the mounting faces 26 by bolts 35 and nuts 36, the bolts 35 extending through openings 37 in the mounting faces 26. The hinge plates 34 have lower portions 34a movable inwardly below channels 25 and upper rim portions 34b movable inwardly above the channels 25.

The mounting faces 26 have slots 38 therein for the reception of springs 39 having portions 40, J-shaped in horizontal cross section, and flat portions 41 which extend through the slots 38 and are mounted on the bolts 35. The J-shaped portions 40 of the springs 39 normally engage the supporting plates 32 for the handles 30 and urge them outwardly but permit the latch handles 30 to be swung toward each other, the J-shaped portions 40 moving inwardly within the channels 25.

The supporting plates 32 have latch tongues 45 thereon which are engageable in latch holes 46 on bracket plates 47 parallel to the long rails 12 and spaced therefrom, the bracket plates 47 having connecting portions 48 for securing to the long rails 12.

The bracket plates 47 have horizontally extending supporting plates 49 secured thereto with supporting rollers 50 carried on pins 51 for receiving and guiding the side frame bars 21 of the walk ramp 20. The pins 51 are carried on vertical bracket plates 52 secured to the supporting plates 49.

The mode of operation should be apparent from the foregoing but will be summarized briefly.

When it is desired to use the walk ramp 20 the handle portions 31 on each side are grasped and moved toward each other about their vertical hinge pins 34 and against the outward pivoting force exerted by the springs 39. This movement withdraws the latch tongues 45 on each side from their engagement in the latch holes 46.

The walk ramp 20 can then be withdrawn for use.

When it is desired to return the walk ramp 20 to its location below the floor of the truck body 11 the handle portions 31 are available for raising the rear end of the walk ramp 20 and moving it towards and into its storage position.

The action of the springs 39 will reseat the latch tongues 45 in the latch holes 46.

We claim:

1. Latch mechanism for a walk ramp having side rails for truck bodies and the like having longitudinal body side rails and a floor thereabove for storage below the floor of the truck body and for movement outwardly of the walk ramp with respect to the body, which comprises a plurality of handle members pivotally carried by the side rails of the walk ramp on vertical pivots, said truck body side rails have spaced brackets with latch plate openings therein, each of said handle members having a latch tongue, and resilient means for urging said handle members to position said latch tongues in said latch plate openings.

2. Latch mechanism as defined in claim 1 in which each said walk ramp side rail has a channel for mounting said handle members.

3. Latch mechanism as defined in claim 1 in which each said walk ramp side rail has a channel for mounting said resilient means.

4. Latch mechanism as defined in claim 1 in which said resilient means comprises a spring.

* * * * *